(12) United States Patent
Yasaki et al.

(10) Patent No.: US 8,145,670 B2
(45) Date of Patent: Mar. 27, 2012

(54) ELECTRONIC FILE SYSTEM, OPERATING DEVICE, APPROVAL DEVICE, AND COMPUTER PROGRAM

(75) Inventors: Masatomo Yasaki, Kawasaki (JP);
Madoka Mitsuoka, Kawasaki (JP);
Yasuhide Matsumoto, Kawasaki (JP);
Yoshihiko Tokumaru, Kawasaki (JP);
Takashi Yamaguchi, Kawasaki (JP);
Hiroyuki Komiyama, Kawasaki (JP);
Youji Kohda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1064 days.

(21) Appl. No.: 11/965,192

(22) Filed: Dec. 27, 2007

(65) Prior Publication Data

US 2008/0215840 A1   Sep. 4, 2008

(30) Foreign Application Priority Data

Dec. 27, 2006   (JP) ................... 2006-353202

(51) Int. Cl.
*G06F 7/00* (2006.01)
*G06F 17/30* (2006.01)

(52) U.S. Cl. ........ 707/781; 707/812; 707/822; 707/825; 707/829; 711/163; 380/201

(58) Field of Classification Search .................. 707/705, 707/781, 783, 812, 822, 825, 828, 829; 711/163; 380/201; 369/47.12; 386/94
See application file for complete search history.

(56) References Cited

U.S. PATENT DOCUMENTS

| | | | | |
|---|---|---|---|---|
| 2001/0039545 A1* | 11/2001 | Nishizawa | ........................ | 707/9 |
| 2002/0004909 A1* | 1/2002 | Hirano et al. | ................. | 713/200 |
| 2002/0091586 A1* | 7/2002 | Wakai et al. | ..................... | 705/26 |
| 2004/0117471 A1* | 6/2004 | Nakamura | .................... | 709/223 |
| 2004/0125402 A1* | 7/2004 | Kanai et al. | .................. | 358/1.15 |
| 2004/0170276 A1* | 9/2004 | Yamasaki et al. | ............... | 386/94 |

(Continued)

FOREIGN PATENT DOCUMENTS

| | | |
|---|---|---|
| JP | 1-296363 A | 11/1989 |
| JP | 10-111856 A | 4/1998 |
| JP | 2003-122615 A | 4/2003 |
| JP | 2005-293426 A | 10/2005 |
| WO | 03/047247 A1 | 5/2003 |

OTHER PUBLICATIONS

Marcio Mourao, Renato Cassaca and Nuno Mamede—"An Independent Domain Dialogue System through a Service Manager"—Springer-Verlag, 2004 (pp. 161-171).*

(Continued)

*Primary Examiner* — John E Breene
*Assistant Examiner* — Anh Ly
(74) *Attorney, Agent, or Firm* — Westerman, Hattori, Daniels & Adrian, LLP

(57) ABSTRACT

An electronic file system includes an operating device for receiving an input for performance of an operation on an electronic file and an approval device used for approving of the operation on the electronic file. The electronic file includes an operation file on which an operation is to be performed and a restriction file indicating a restriction condition (policy) for restricting an operation performable on the operation file and a request destination for approval of the restricted operation. The operating device includes determination means for determining whether the operation to be performed on the operation file is permitted in accordance with the restriction condition described in the restriction file and means for, when it is determined that the operation corresponds to the restriction condition, transmitting to the approval device described as the request destination in the restriction file an approval request for requesting approval of the operation.

12 Claims, 12 Drawing Sheets

U.S. PATENT DOCUMENTS

| | | | | |
|---|---|---|---|---|
| 2004/0243454 | A1* | 12/2004 | Yoshida | 705/7 |
| 2005/0027757 | A1* | 2/2005 | Kiessig et al. | 707/204 |
| 2006/0290967 | A1* | 12/2006 | Sumitomo et al. | 358/1.14 |
| 2007/0038747 | A1* | 2/2007 | Kishimoto et al. | 709/224 |
| 2007/0220068 | A1* | 9/2007 | Thompson et al. | 707/203 |
| 2009/0216798 | A1* | 8/2009 | Wahlert et al. | 707/103 R |
| 2009/0271580 | A1* | 10/2009 | Oe et al. | 711/161 |

OTHER PUBLICATIONS

Ferraiolo et al.—"Proposed NIST Standard for Role-Based Access Control"—ACM Transaction on Information System Securit vol. 4, No. 3, Aug. 2001 (pp. 224-274).*

Washio et al., "The Proposal of a Usage Control Method that Utilizes a Propagation of Document Attributes", The Special Interest Group Notes of IPSJ, Japan: Information Processing Society of Japan, vol. 2005, No. 33, pp. 375-380. partial English Translator enclosed and cited in Japanese Office Action dated Sep. 27, 2011.

Hitachi Open-Middleware for Supporting Internal Control, Haitakku, Japan, Hitachi Ltd., Sep. 1, 2006, vol. 472, p. 23-26, and cited in Japanese Office Action dated Dec. 13, 2011.

Japanese Office Action dated Dec. 13, 2011 for corresponding Japanese Application 2006-353202, with partial translation.

* cited by examiner

FIG. 4

```
<Copy Management>
    <Approver List>
        <Approver sequence="1">
            <Name>Yamada Tarou</Name>
            <Address type="email">tarou@xxx.jp</Address>
            <Organization code="1111" up="0111">Sales Division</Organization>
        </Approver>
        <Approver sequence="2">
            <Name>Yamada Hanako</Name>
            <Address type="email">hanako@xxx.jp</Address>
            <Staff Organization code="0111">Administration Division</Staff Organization>
        </Approver>
    </Approver List>
    <Copy Restriction>
        <Number of Restriction Times>1</Number of Restriction Times>
        <Period of Validity type="DateAndHour">12-30-2006</Period of Validity>
        <Item to be Monitored>
            <Name of Item action="Update">Price Cost</Name of Item>
            <Name of Item action="Update">Hourly Pay</Name of Item>
        </Item to be Monitored>
        <flags>
            <Deletion Flag timing="After Approval Request">1</Deletion Flag>
            <Approval-Request Active Flag>0</Approval-Request Active Flag>
            <Original Flag>1</Original Flag>
        </flags>
    </Copy Restriction>
</Copy Management>
```

FIG. 5

```
<History Management create="10-10-2006 09:00:00" update="10-11-2006 10:45:00">
    <log date="10-11-2006 10:00:00" user="Fuji Tarou" access="read" file="Cost Calculation.xls" />
    <log date="10-11-2006 10:30:00" user="Fuji Tarou" access="print" file="Cost Calculation.xls" />
    <log date="10-11-2006 10:45:00" user="Fuji Tarou" access="write" file="Cost Calculation.xls" item="A Working Hours">45 Hours</log>
</History Management>
<File create="10-10-2006 09:00:00">
    <Data name="Financial Calculation.xls" create="10-09-2006 09:00:00">
        <Item name="Price Cost">100 Yen</Item>
        <Item name="Cost of Component A">10 Yen</Item>
    </Data>
    <Data name="Cost Calculation.xls" create="10-09-2006 09:00:00">
        <Item name="Total Cost">One Million</Item>
        <Item name="Hourly Pay">800 Yen</Item>
        <Item name="Number of Employees">Ten</Item>
        <Item name="A Working Hours">40 Hours</Item>
    </Data>
</File>
```

FIG. 9

```
<Copy Management>
    <Approver List next="2">
        <Approver sequence="1">
            <Name>Yamada Tarou</Name>
            <Address type="email">tarou@xxx.jp</Address>
            <Organization code="1111" up="0111">Sales Division</Organization>
        </Approver>
        <Approver sequence="2">
            <Name>Yamada Hanako</Name>
            <Address type="email">hanako@xxx.jp</Address>
            <Staff Organization code="0111">Administration Division</Staff Organization>
        </Approver>
        <Approver sequence="3">
            <Name>Yamada Taiyo</Name>
            <Address type="email">taiyo@xxx.jp</Address>
            <Staff Organization code="0011">Accounting Division</Staff Organization>
        </Approver>
    </Approver List>
    <Copy Restriction>
        <Number of Restriction Times>1</Number of Restriction Times>
        <Period of Validity type="DateAndHour">12-30-2006</Period of Validity>
        <Item to be Monitored>
            <Name of Item action="Update">Price Cost</Name of Item>
            <Name of Item action="Update">Hourly Pay</Name of Item>
        </Item to be Monitored>
        <flags>
            <Deletion Flag timing="After Approval Request">1</Deletion Flag>
            <Approval-Request Active Flag>0</Approval-Request Active Flag>
            <Original Flag>0</Original Flag>
        </flags>
    </Copy Restriction>
</Copy Management>
```

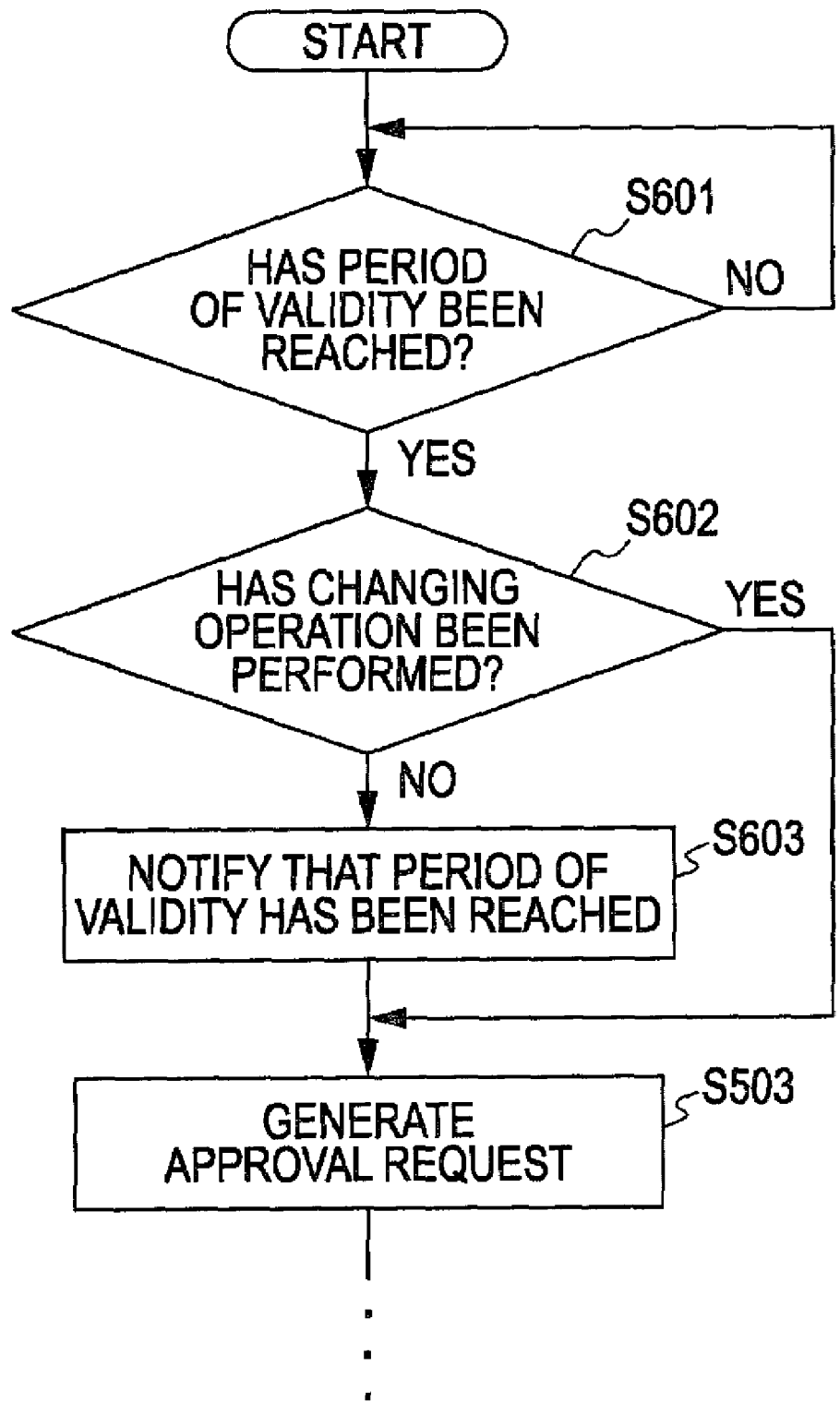

ELECTRONIC FILE SYSTEM, OPERATING DEVICE, APPROVAL DEVICE, AND COMPUTER PROGRAM

CROSS REFERENCES TO RELATED APPLICATIONS

This application is based upon and claims the benefit of priority from the prior Japanese Patent Application No. 2006-353202, filed on Dec. 27, 2006, the entire content of which is incorporated herein by reference.

BACKGROUND OF THE INVENTION

1. Field of the Invention

The present invention relates to an electronic file system including an operating device receiving an input for performance of an operation on an electronic file and an approval device used for approving the performance of the operation on the electronic file, to the operating device used in the electronic file system, to the approval device used in the electronic file system, and to a computer program for implementing the operating device. More particularly, the present invention relates to an electronic file system, an operating device, an approval device, and a computer program that restrict operations, such as changing, copying, and the like performable on a file.

2. Description of the Related Art

In recent years, due to the establishment of Japanese Sarbanes-Oxley Act (SOX) legislation, the importance of collection and management of tracking information relating to financial information of a business entity has been increased. In such circumstances, various electronic file systems that restrict operations, such as changing, copying, and the like, performable on files have become commonplace. A system that causes a server to perform control, such as restriction of operations, is disclosed in Japanese Unexamined Patent Application Publication No. 2005-293426.

However, a practically used electronic file system generates a file in accordance with a format that can be executed on a dedicated application. Thus, in the case of performing an operation on data of the file, it is necessary to transfer the data to general-purpose application software, such as general-purpose spreadsheet application software, and to perform various operations on the data. In such a case, the system cannot restrict operations performable on the transferred data.

In addition, since the system disclosed in Japanese Unexamined Patent Application Publication No. 2005-293426 requires introduction of a server, an installation cost, a management cost, and the like are increased.

In order to solve the above-described problems, an object of the present invention is to provide an electronic file system that controls various operations performable on an electronic file including an operation file on which an operation is to be performed and a restriction file indicating a restriction condition for restricting an operation performable on the operation file and a request destination for approval of the restricted operation, that uses a file corresponding to general-purpose application software as the operation file, and that does not require transfer of data or installation of a server; an operating device used in the electronic file system; an approval device used in the electronic file system; and a computer program for implementing the operating device.

SUMMARY OF THE INVENTION

According to a first aspect of the present invention, an electronic file system includes an operating device for receiving an input for performance of an operation on an electronic file and an approval device used for approving the performance of the operation on the electronic file. The electronic file includes an operation file on which an operation is to be performed and a restriction file indicating a restriction condition (policy) for restricting an operation performable on the operation file and a request destination for approval of the restricted operation. The operating device includes determination means for determining whether the operation to be performed on the operation file is permitted in accordance with the restriction condition described in the restriction file and means for, when it is determined that the operation corresponds to the restriction condition, transmitting to the approval device described as the request destination in the restriction file an approval request for requesting approval of the operation.

According to a second aspect of the present invention, an operating device for receiving an input for performance of an operation on an electronic file includes means for recording an electronic file including an operation file on which an operation is to be performed and a restriction file indicating a restriction condition for restricting an operation performable on the operation file and a request destination for approval of the restricted operation, means for determining whether the operation to be performed on the operation file is permitted in accordance with the restriction condition described in the restriction file, and means for, when it is determined that the operation corresponds to the restriction condition, transmitting to the request destination described in the restriction file an approval request for requesting approval of the operation.

According to a third aspect of the present invention, an approval device used for approving performance of an operation on an electronic file, an input for the performance of the operation being received by an operating device, includes means for transmitting to the operating device an electronic file including an operation file on which an operation is to be performed and a restriction file indicating a restriction condition for restricting an operation performable on the operation file and a request destination for approval of the restricted operation, means for receiving from the operating device an approval request for requesting approval of an operation corresponding to the restriction condition for the operation file, and means for, when receiving an input indicating that the performance of the operation is approved for the received approval request, approving the performance of the operation.

According to a fourth aspect of the present invention, a computer-readable storage medium storing a program for causing a computer including means for receiving an input for performance of an operation to perform processing based on an operation performable on an electronic file includes a step of determining whether an operation to be performed on an operation file included in the electronic file including the operation file on which an operation is to be performed and a restriction file indicating a restriction condition for restricting an operation performable on the operation file and a request destination for approval of the restricted operation is permitted in accordance with the restriction condition described in the restriction file and a step of, when it is determined that the operation corresponds to the restriction condition, transmitting to the request destination described in the restriction file an approval request for requesting approval of the operation.

BRIEF DESCRIPTION OF THE DRAWINGS

FIG. 4 is an explanatory illustration of an example of the contents of a restriction file used in an electronic file system according to an embodiment of the present invention;

FIG. 5 is an explanatory illustration of an example of the contents of a history file used in an electronic file system according to an embodiment of the present invention;

FIG. 9 is an explanatory illustration of an example of the contents of a restriction file used in an electronic file system according to an embodiment of the present invention;

FIG. 12 is a flowchart showing an example of a file-period-management process performed by an operating device provided in an electronic file system according to an embodiment of the present invention.

DESCRIPTION OF THE PREFERRED EMBODIMENTS

Figure 1:
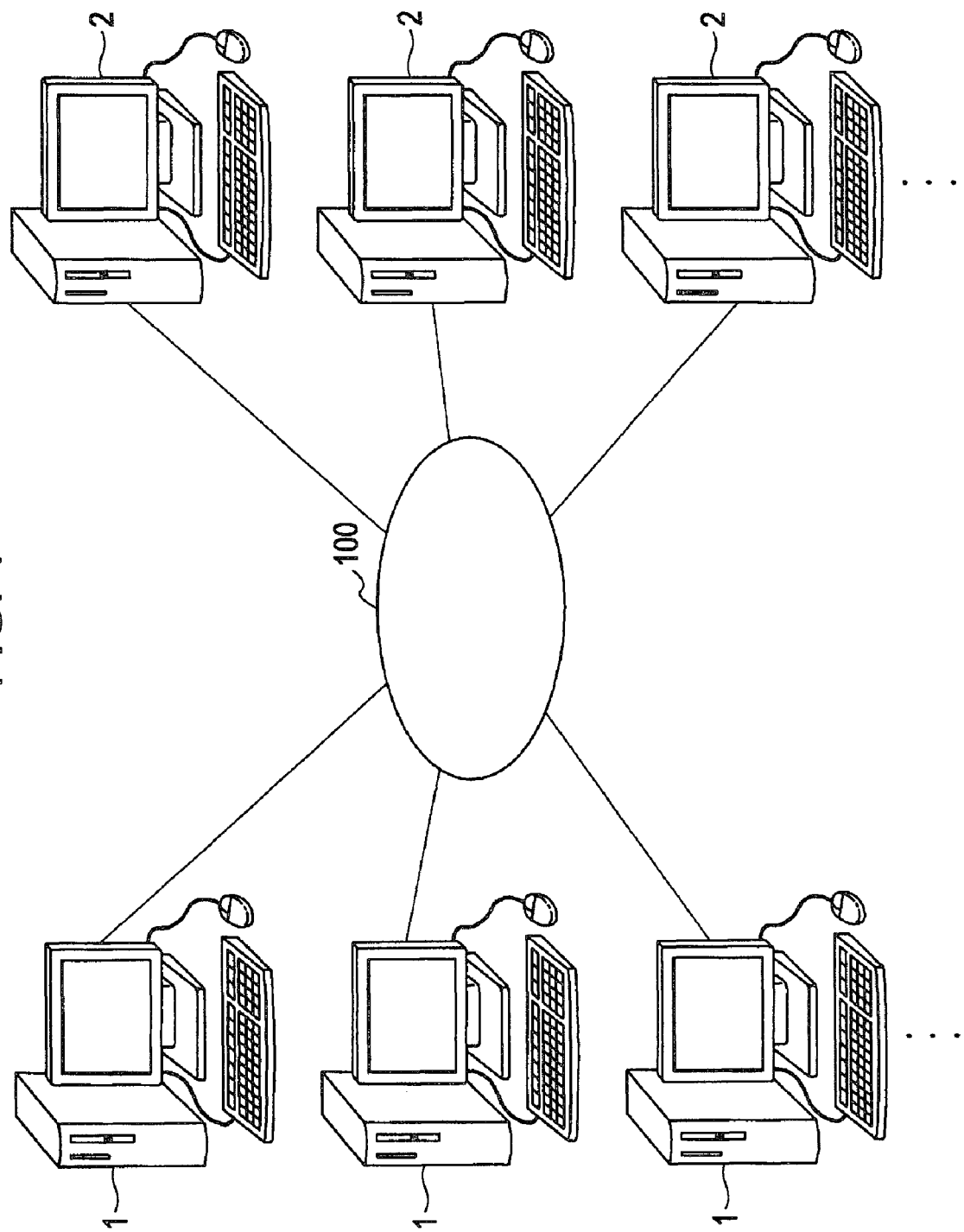
FIG. 1 is block diagram showing of the configuration of an electronic file system according to an embodiment of the present invention.

Embodiments of the present invention will be described with reference to the drawings. FIG. 1 is block diagram showing a configuration of an electronic file system according to an embodiment of the present invention. An operating device 1 is an operating device according to an embodiment of the present invention using a computer, such as a terminal computer. The operating device 1 receives an input for performance of an operation on an electronic file from an operator. The operating device 1 is connected to a communication network 100, such as a local-area network (LAN) or a wide-area network (WAN). An approval device 2 using a computer, such as a terminal computer, is connected to the communication network 100. The approval device 2 is a device used for processing, such as generation of an electronic file, approval (authorization) of performance of an operation on the electronic file, and the like. The approval device 2 is operated by a host operator who approves performance of an operation requested from an operator. As shown in FIG. 1, a plurality of operating devices 1 and a plurality of approval devices 2 are connected to the communication network 100. For convenience of description, descriptions of the operating device 1 and the approval device 2 will be provided. However, the descriptions represent a relative relationship between the operating device 1 and the approval device 2 with respect to an operation file. The descriptions do not represent an absolute relationship between the operating device 1 and the approval device 2 with respect to an operation file. That is, the operating device 1 can be used as the approval device 2, and the approval device 2 can be used as the operating device 1.

Figure 2:
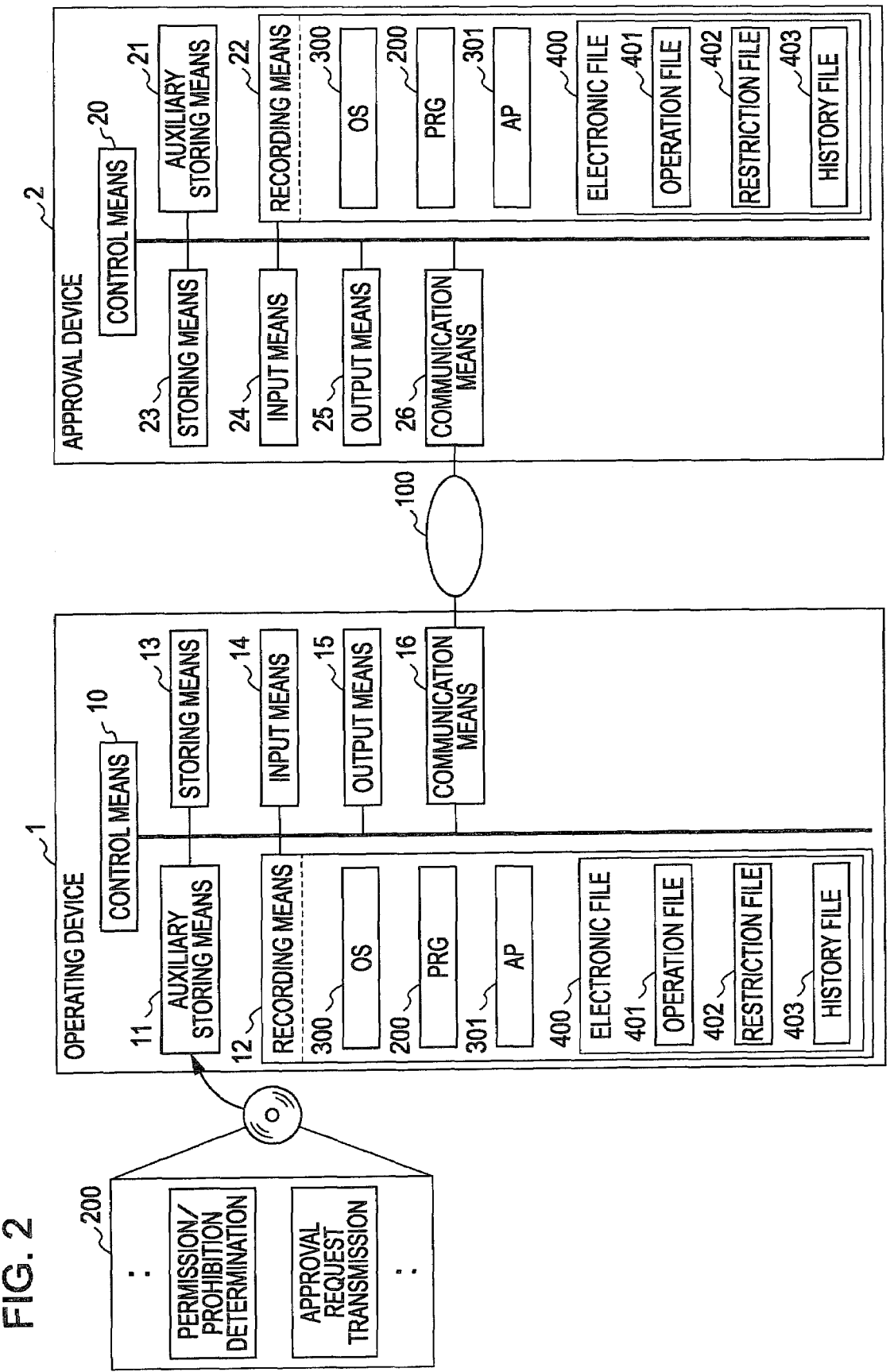
FIG. 2 is a block diagram showing an example of the configuration of devices used in an electronic file system according to an embodiment of the present invention.

FIG. 2 is a block diagram showing an example of the configurations of devices used in an electronic file system according to an embodiment of the present invention. FIG. 2 illustrates a hardware configuration of each of the devices. The operating device 1 includes control means 10, auxiliary storing means 11, recording means 12, storing means 13, input means 14, output means 15, and communication means 16. The control means 10 is, for example, a central processing unit (CPU) that controls the entire operating device 1. The auxiliary storing means 11 is, for example, a compact disc read-only memory (CD-ROM) drive. For example, a computer program (PRG) 200 according to an embodiment of the present invention and various types of information, such as data, are recorded in a recording medium, such as a CD-ROM. The recording means 12 is, for example, a hard disk. Various types of information read by the auxiliary storing means 11 are recorded in the recording means 12. The storing means 13 is, for example, a random-access memory (RAM). Information is temporarily stored in the storing means 13. A computer operates as the operating device 1 according to an embodiment of the present invention when the computer program 200 according to an embodiment of the present invention recorded in the recording means 12 is stored into the storing means 13 and is implemented under the control of the control means 10. The input means 14 includes, for example, a mouse and a keyboard. The input means 14 receives an operation input entered by an operator. The output means 15 includes, for example, a monitor and a printer. The communication means 16 is, for example, a LAN port connected to the communication network 100.

Various application programs (APs), such as a mail transmission/reception program 302 and a spreadsheet software program 301, running on a basic program (operating system (OS)) 300, as well as the computer program 200 according to an embodiment of the present invention, are recorded in the recording means 12. An electronic file 400 on which an operation is to be performed is encrypted and is recorded in the recording means 12. The electronic file 400 includes an operation file 401 on which an operation is to be performed, a restriction file 402 indicating information, such as a restriction condition for restricting an operation performable on the operation file 401, and a history file 403 recording history data of an operation performed on the operation file 401. The operation file 401 is a file on which an operation is performed in accordance with the application program 301 or 302. The operation file 401 is in accordance with a format corresponding to the type of application program 301 or 302. The operation file 401 may include a plurality of operation files 401, and restriction and history data regarding each of the plurality of operation files 401 may be represented in the restriction file 402 and the history file 403, respectively.

The approval device 2 has a configuration substantially similar to the operating device 1. The approval device 2 includes control means 20, auxiliary storing means 21, recording means 22, storing means 23, input means 24, output means 25, and communication means 26. The computer program 200 according to an embodiment of the present invention, the basic program 300, the application program 301 or 302, and the electronic file 400 are recorded in the recording means 22. The electronic file 400 includes the operation file 401, the restriction file 402, and the history file 403.

Figure 3:
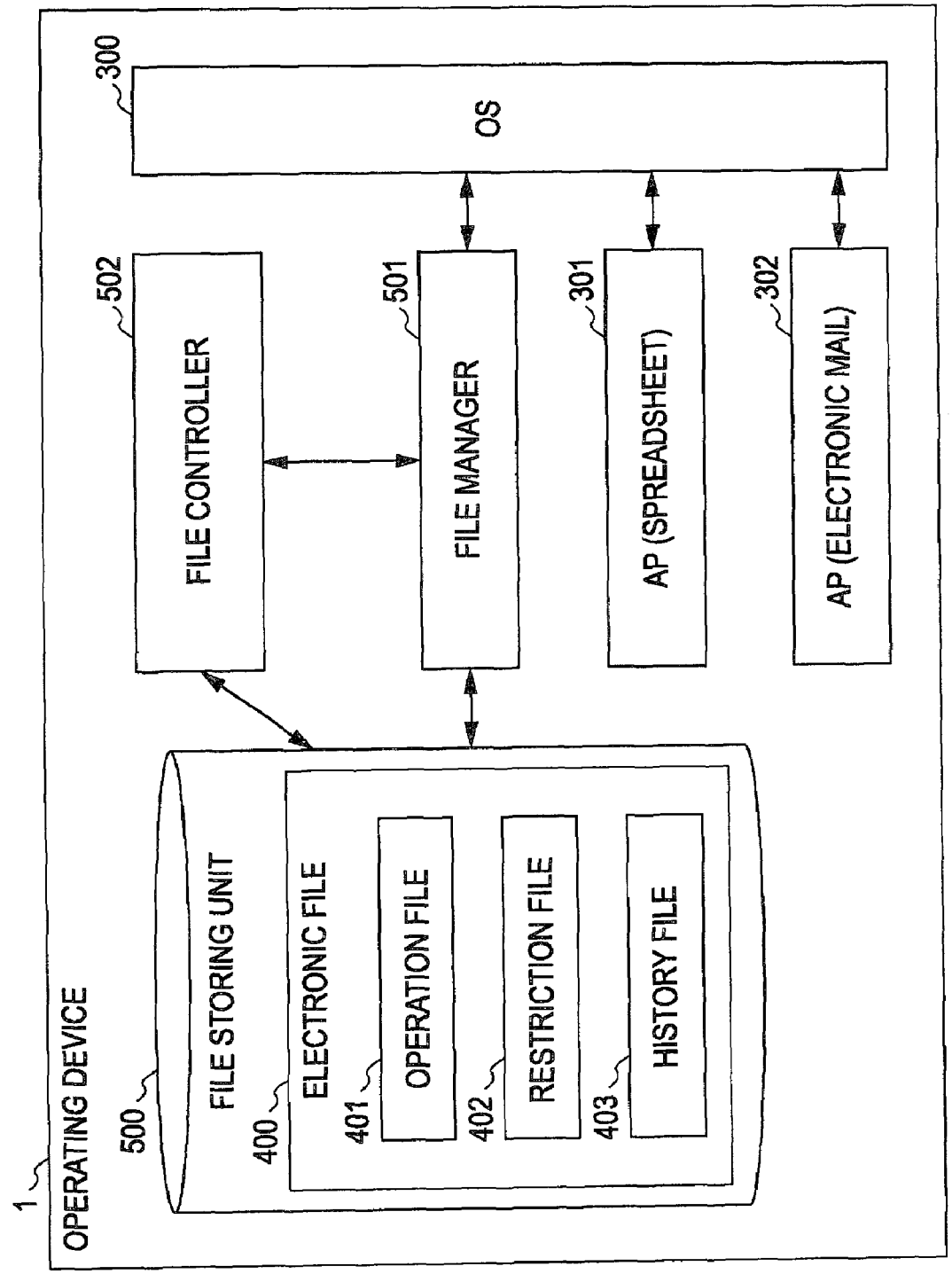
FIG. 3 is a functional block diagram showing an example of the configuration of an operating device used in an electronic file system according to an embodiment of the present invention.

FIG. 3 is a functional block diagram showing an example of the configuration of the operating device 1 used in an electronic file system according to an embodiment of the present invention. In FIG. 3, an example of the configuration of the operating device 1 is illustrated as a functional block diagram. The operating device 1 includes a file storing unit 500 that stores the electronic file 400 that has been encrypted and that includes the operation file 401, the restriction file 402, and the history file 403. The file storing unit 500 is provided in the recording means 12, which is a hard disk. However, a physical drive or a virtual disk drive may be used as the file storing unit 500. Alternatively, an external device or a recording medium, such as an IC memory, may be used as the file storing unit 500. The operating device 1 also includes a file manager 501 and a file controller 502. The file manager 501 performs encryption and decryption of the electronic file 400 stored in the file storing unit 500 and performs various determinations in accordance with restriction conditions described in the restriction file 402. The file controller 502 controls the file storing unit 500 and the file manager 501. The file manager 501 operates in accordance with the basic program 300. As described above, the application program, such as the electronic mail transmission/reception program 302 or the spreadsheet software program 301, operates in accordance with the basic program 300. The operation file 401 that has been decrypted is loaded to the application program 301 or 302. Thus, an operator who performs an operation on the operation file 401 using a man-machine interface based on the basic program 300 is able to perform an operation without being conscious of an encryption state of the operation file 401. Since the functional block diagram of the approval device 2 is substantially similar to that of the operating device 1, as shown in FIG. 3, the description of the functional block diagram of the approval device 2 will be omitted.

FIG. 4 is an explanatory illustration showing an example of the contents of the restriction file 402 used in an electronic file system according to an embodiment of the present invention. As shown in FIG. 4, the restriction file 402 is generated in accordance with an Extensible Markup Language (XML) format or the like. The restriction file 402 contains items to be defined and information on the items. Information indicated by a tag defined as an "Approver List" represents information on approvers serving as request destinations for approval requests for operations. Referring to FIG. 4, a plurality of approvers are defined as "Approver" and the sequence of approval is provided as "Sequence" to each of the approvers. Information on an approver, such as the name of the approver, the electronic mail address of the approver serving as a request destination, and the organization to which the approver belongs, is provided.

Information indicated by a tag defined as "Copy Restriction" represents information on restriction, such as restriction conditions for the operation file 401. Information indicated by a tag defined as "Number of Restriction Times" represents the number of times a copying operation is allowed to be performed on the operation file 401. Information indicated by a tag defined as "Period of Validity" represents the period of validity by which an operation, such as changing, is to be performed on the operation file 401. Information indicated by a tag defined as "Item to be Monitored" represents an item for which a changing operation is restricted. In the example shown in FIG. 4, the information represents that a changing operation to be performed on items "Price Cost" and "Hourly Pay" is restricted. In addition, the number of times the changing operation is allowed to be performed can be restricted by using information indicated by a tag defined as "Number of Items to be Changed". Information indicated by a tag defined as "flags" represents various states relating to the operation file 401. In the example shown in FIG. 4, a "Deletion Flag" represents that a file is to be deleted when approval of an operation is requested, an "Approval-Request Active Flag" represents that approval is not being requested, and an "Original Flag" represents that a file is original. Here, "original" means that the operation file 401 is not a copied one.

FIG. 5 is an explanatory illustration showing an example of the contents of the history file 403 used in an electronic file system according to an embodiment of the present invention. As shown in FIG. 5, the history file 403 is generated, for example, in accordance with an XML format or the like, and contains items to be defined and information on the items. As shown in FIG. 5, the date and time on which the operation file 401 was created, the name of an operation file on which a changing operation was performed, the date and time on which the changing operation was performed, and the details of the changing operation are described in the history file 403. The details of the changing operation are recorded in a portion indicated by a tag defined as "History Management". As history management, various type of information, such as date and time information indicating the date and time on which a changing operation was performed, information on an operator who performed the changing operation, the details of the changing operation, the name of the operation file 401 on which the changing operation was performed, the name of an item on which the changing operation was performed, and information after the changing operation was performed, are recorded. Accordingly, since a changing operation for the operation file 401 is recorded as history management, collection and management of tracking information can be achieved.

Figure 6:
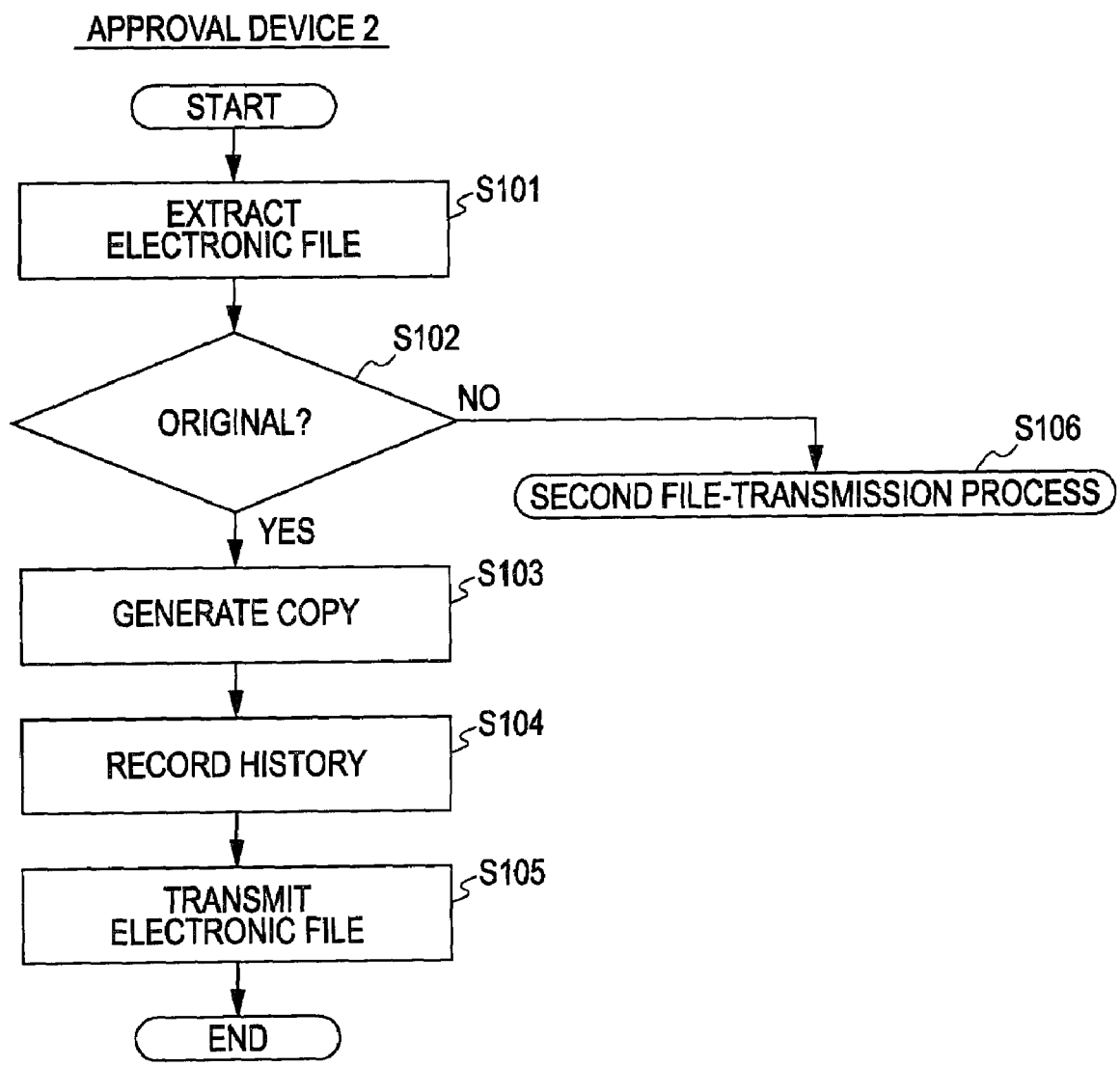
FIG. 6 is a flowchart showing an example of a first file-transmission process performed by an approval device provided in an electronic file system according to an embodiment of the present invention.

Processing of each of the devices used in an electronic file system according to an embodiment of the present invention will be described. FIG. 6 is a flowchart showing an example of a first file-transmission process performed by the approval device 2 provided in an electronic file system according to an embodiment of the present invention. The file-transmission process is a process for transmitting a copy of a stored electronic file 400 to another device and includes copying processing. As described above, since the operating device 1 and the approval device 2 according to an embodiment of the present invention are substantially similar to each other, any of the operating device 1 and the approval device 2 is capable of performing a file-transmission process. For convenience of description, a file-transmission process performed by the approval device 2 is referred to as a first file-transmission process, and a file-transmission process performed by the operating device 1 is referred to as a second file-transmission process.

An operator performs an operation for designating, using the input means 24, an operation file 401 to be transmitted from among a plurality of operation files 401 stored in the file storing unit 500 of the recording means 22 and transmitting the designated operation file 401 to another device (in this case, the operating device 1). The approval device 2 receives an input for performance of an operation through the input means 24 under the control of the control means 20 that implements the computer program 200. The file manager 501 extracts an electronic file 400 including the designated operation file 401 (step S101). The file manager 501 determines whether the designated operation file 401 is original by referring to an original flag indicated in a restriction file 402 included in the extracted electronic file 400 (step S102). The electronic file 400 extracted in step S101 is decrypted by the file manager 501.

In this example, the file-transmission process performed by the approval device 2 is explained as the first file-transmission process. Since the operating device 1 and the approval device 2 according to an embodiment of the present invention are substantially similar to each other, in the case of performing a file-transmission process, it is necessary to determine whether the file-transmission process is the first file-transmission process performed by a device according to an embodiment of the present invention used as the approval device 2 or the second file-transmission process performed by a device according to an embodiment of the present invention used as the operating device 1. The processing of step S102 is performed in order to determine whether a device according to an embodiment of the present invention is used as the operating device 1 or the approval device 2. If it is determined in step S102 that the designated operation file 401 is original, it is determined that the device is used as the approval device 2, which stores the original. If it is determined in step S102 that the designated operation file 401 is not original, it is determined that the device is used as the operating device 1.

If it is determined in step S102 that the designated operation file 401 is original (if the determination in step S102 is YES), the approval device 2 causes, under the control of the control means 20, the file manager 501 to generate a copy of the electronic file 400 (step S103). The file manager 501 records history data of copying into a history file 403 corresponding to the original operation file 401 (step S104). The electronic mail transmission/reception program 302, which is an application program, causes the communication means 26 to transmit the generated electronic file 400 to the operating device 1 via the communication network 100 (step S105). In a restriction file 402 included in the electronic file 400 generated in step S103, an original flag indicating that the file is not original is set. In step S105, the electronic file 400, which has been encrypted, is transmitted.

If it is determined in step S102 that the designated operation file 401 is not original (if the determination in step S102 is NO), the approval device 2 performs a second file-transmission process, which will be described later, under the control of the control means 20 (step S106). Accordingly, the first file-transmission process is performed.

Figure 7:
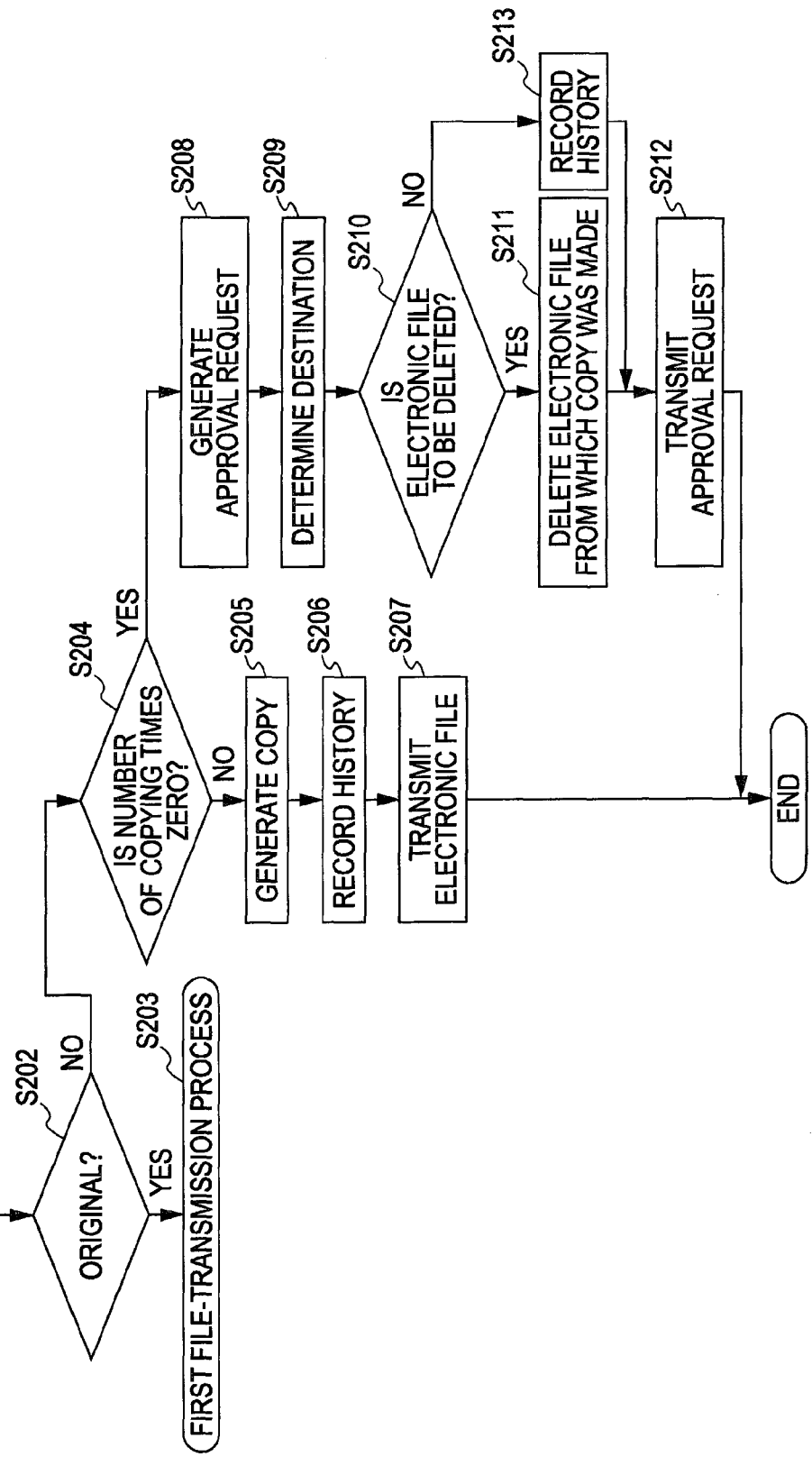
FIG. 7 is a flowchart showing an example of a second file-transmission process performed by an operating device provided in an electronic file system according to an embodiment of the present invention.

FIG. 7 is a flowchart of an example of the second file-transmission process performed by the operating device 1 provided in an electronic file system according to an embodiment of the present invention. An operator performs an operation for designating, using the input means 14, an operation file 401 to be transmitted from among a plurality of operation files 401 stored in the file storing unit 500 of the recording means 12 and transmitting the designated operation file 401 to another device, such as another operating device 1. The operating device 1 receives an input for performance of an operation through the input means 14 under the control of the control means 10 that implements the computer program 200. The file manager 501 extracts an electronic file 400 including the operation file 401 designated through the input means 14 (step S201). The file manager 501 determines whether the designated operation file 401 is original by referring to an original flag indicated in a restriction file 402 included in the extracted electronic file 400 (step S202).

If it is determined in step S202 that the designated operation file 401 is original (if the determination in step S202 is YES), the operating device 1 performs the processing of step S103 and the subsequent processing of the above-described first file-transmission process under the control of the control means 10 (step S203).

If it is determined in step S202 that the designated operation file 401 is not original (if the determination in step S202 is NO), the operating device 1 causes, under the control of the control means 10, the file manager 501 to determine whether the number of times the copying operation is allowed to be performed is zero by referring to information represented as copy restriction in a restriction file 402 included in the electronic file 400 (step S204). If it is determined in step S204 that the number of times the copying operation is allowed to be performed is not zero, it is determined that a transmission operation including copying is permitted. If it is determined in step S204 that the number of times the copying operation is allowed to be performed is zero, it is determined that a transmission operation including copying requires approval by a host operator.

If it is determined in step S204 that the number of times the copying operation is allowed to be performed is not zero (if the determination in step S204 is NO), the operating device 1 causes, under the control of the control means 10, the file manager 501 to generate a copy of the electronic file 400 (step S205). The file manager 501 records history data of copying into a history file 403 included in the electronic file 400 from which the copy was made (step S206). The file manager 501 causes the communication means 16 to transmit the electronic file 400 generated in step S205 to another device via the communication network 100 in accordance with the electronic mail transmission/reception program 302, which is an application program (step S207). In step S207, the electronic file 400, which has been encrypted, is transmitted.

If it is determined in step S204 that the number of times the copying operation is allowed to be performed is zero (if the determination in step S204 is YES), the operating device 1 causes, under the control of the control means 10, the file manager 501 to generate an approval request for requesting approval of the performance of the operation (step S208). The approval request generated in step S208 is a copy of the electronic file 400 designated to be transmitted. In an item of an approval-request active flag indicated in a restriction file 402 included in the copied electronic file 400, information indicating that approval is being requested is set. In a history file 403 included in the copied electronic file 400, information indicating the details of the requested operation is recorded. Copying as the approval request generated in step S208 is not affected by the restriction regarding the number of times the copying operation is allowed to be performed indicated in the restriction file 402.

The operating device 1 causes, under the control of the control means 10, the file manager 501 to refer to an approver described in the restriction file 402 included in the electronic file 400 to be transmitted and to determine a request destination for the approval, that is, a transmission destination for the approval request (step S209). In step S209, the approver defined as an approver in the restriction file 402 is determined to be a transmission destination. If a plurality of approvers are defined in the restriction file 402, a transmission destination is determined in accordance with an approval sequence.

Then, the operating device 1 causes, under the control of the control means 10, the file manager 501 to refer to a deletion flag indicated in the restriction file 402 included in the electronic file 400 to be transmitted and to determine whether the electronic file 400 from which the copy was made is to be deleted (step S210).

If it is determined in step S210 that the electronic file 400 from which the copy was made is to be deleted (if the determination in step S210 is YES), the operating device 1 causes, under the control of the control means 10, the file manager 501 to delete the electronic file 400 from which the copy was made (step S211). The file manager 501 causes the communication means 16 to transmit the copied electronic file 400 as an approval request to the approval device 2, which is the transmission destination (request destination) determined in step S209, via the communication network 100 in accordance with the electronic mail transmission/reception program 302, which is an application program (step S212). In step S212, the electronic file 400, which has been encrypted, is transmitted.

If it is determined in step S210 that the electronic file 400 from which the copy was made does not have to be deleted (if the determination in step S210 is NO), the operating device 1 causes, under the control of the control means 10, the file manager 501 to record history data of copying into a history file 403 corresponding to the operation file 401 from which the copy was made (step S213). Then, the operating device 1 proceeds to step S212 to transmit the copied electronic file 400 as the approval request to the approval device 2 (step S212). Accordingly, the second file-transmission process is performed.

Figure 8:
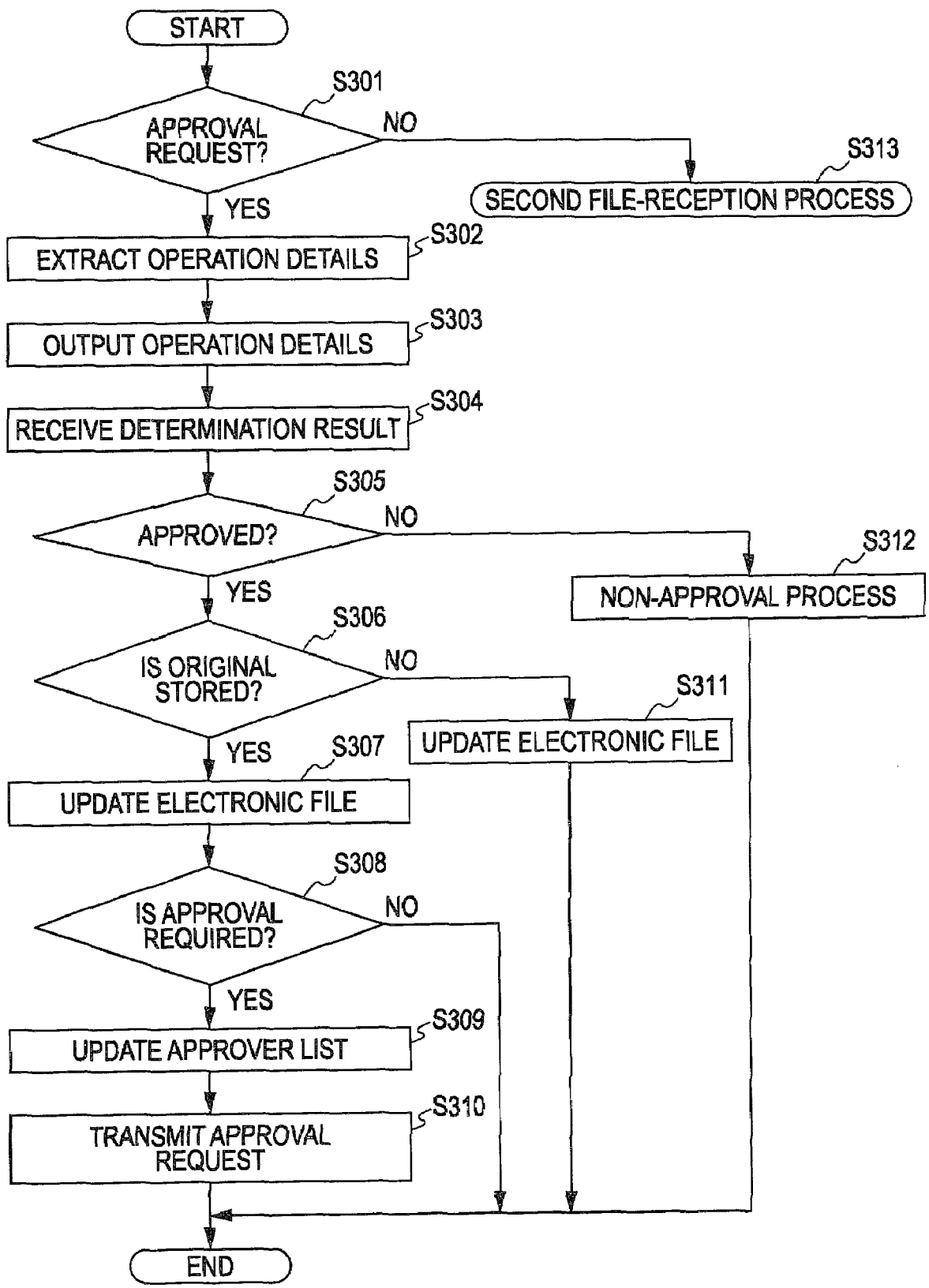
FIG. 8 is a flowchart showing an example of a first file-reception process performed by an approval device provided in an electronic file system according to an embodiment of the present invention.

FIG. 8 is a flowchart showing an example of a first file-reception process performed by the approval device 2 provided in an electronic file system according to an embodiment of the present invention. A file-reception process is a process to be performed in accordance with an input for performance of an operation on an electronic file 400 received in an electronic mail format or the like. As described above, since the operating device 1 and the approval device 2 according to an embodiment of the present invention are substantially similar to each other, a file-reception process can be performed by any of the operating device 1 and the approval device 2. However, for convenience of description, a file-reception process performed by the approval device 2 is referred to as a first file-reception process, and a file-reception process performed by the operating device 1 is referred to as a second file-reception process.

An operator performs an operation for designating, using the input means 24, an electronic file 400 whose contents are to be checked for from among a plurality of received electronic files 400. The approval device 2 receives an input for performance of an operation through the input means 24 under the control of the control means 20 that implements the computer program 200. The file manager 501 refers to an approval-request active flag indicated in a restriction file 402 included in the designated electronic file 400, and determines whether the designated electronic file 400 is an electronic file 400 transmitted as an approval request (step S301). If it is determined in step S301 that the designated electronic file 400 is an approval request, it is determined that the operation is performed by the approval device 2 that received the approval request. If it is determined in step S301 that the designated electronic file 400 is not an approval request, it is determined that the operation is performed by the operating device 1. In step S301, the determination is performed on the electronic file 400, which has been decrypted.

If it is determined in step S301 that the designated electronic file 400 is an approval request (if the determination in step S301 is YES), the approval device 2 causes, under the control of the control means 20, the file manager 501 to extract from a history file 403 included in the electronic file 400 the details of an operation for which approval is requested (step S302). The file manager 501 causes the output means 25 to output the extracted details of the operation for which approval is requested (step S303). The operator checks for the details of the operation, which are output in step S303, and determines whether the performance of the operation is permitted. Then, the operator inputs the determination result to the approval device 2 using the input means 24.

The approval device 2 receives the determination result through the input means 24 under the control of the control means 20 (step S304), and determines whether the received determination result indicates that the performance of the operation is approved (step S305).

If it is determined in step S305 that the performance of the operation is approved (if the determination in step S305 is YES), the approval device 2 causes, under the control of the control means 20, the file manager 501 to perform, as processing for approving the performance of the operation, determination of whether an original corresponding to the received electronic file 400 is stored in the file storing unit 500 of the recording means 22 (step S306).

If it is determined in step S306 that the original is stored (if the determination in step S306 is YES), the approval device 2 causes, under the control of the control means 20, the file manager 501 to update the operation file 401, the restriction file 402, and the history file 403 included in the original electronic file 400 in accordance with the details of the approved operation (step S307).

The approval device 2 causes, under the control of the control means 20, the file manager 501 to refer to the restriction file 402 included in the received electronic file 400 and to determine whether a further approval is required (step S308). The processing of step S308 is performed in order to determine whether the present approver is the last approver when a plurality of approvers are set. If only a single approver is set, the determination in step S308 is NO.

If it is determined in step S308 that a further approval is required (if the determination in step S308 is YES), the approval device 2 causes, under the control of the control means 20, the file manager 501 to update an item of an "Approver List" indicated in each of the restriction file 402 included in the received electronic file 400 and the restriction file 402 included in the original electronic file 400 (step S309). The file manager 501 causes the communication means 16 to transmit the electronic file 400 received as an approval request to another approval device 2, which is set as the next approver, in accordance with the electronic mail transmission/reception program 302, which is an application program (step S310). In step S310, the electronic file 400, which has been encrypted, is transmitted.

FIG. 9 is an explanatory illustration showing an example of the contents of a restriction file 402 used in an electronic file system according to an embodiment of the present invention. FIG. 9 illustrates an "Approver List" updated in step S309. Information indicating "Approver List next=2" is provided in the example shown in FIG. 9. This information represents that approval by an operator "Yamada Tarou" whose approval sequence number is "1" has been completed and that approval by an operator "Yamada Hanako" is being requested.

Referring back to the flowchart of FIG. 8, if it is determined in step S308 that a further approval is not required (if the determination in step S308 is NO), the approval device 2 does not perform the processing of step S309 and the subsequent processing. The process is terminated.

If it is determined in step S306 that the original is not stored (if the determination in step S306 is NO), the approval device 2 causes, under the control of the control means 20, the file manager 501 to generate, in accordance with the received electronic file 400, an electronic file 400 in which the original flag indicated in the restriction file 402 included in the received electronic file 400 is updated, and to store the generated electronic file 400 as the original electronic file 400 into the file storing unit 500 of the recording means 22 (step S311). Then, the approval device 2 proceeds to step S308 and performs the subsequent processing.

If it is determined in step S305 that the performance of the operation is not approved (if the determination in step S305 is NO), the approval device 2 performs, under the control of the control means 20, non-approval processing for transmitting a notification indicating that the performance of the operation is not approved to the request destination for the approval and another approval device 2 that has approved the performance of the operation (step S312). The device receives the notification and outputs the notification. If the device stores an electronic file 400, a history file 403 included in the electronic file 400 is updated.

If it is determined in step S301 that the designated electronic file 400 is not an approval request (if the determination in step S301 is NO), the approval device 2 performs, under the control of the control means 20, a second file-reception process, which will be described later (step S313). Accordingly, the first file-reception process is performed.

Figure 10:
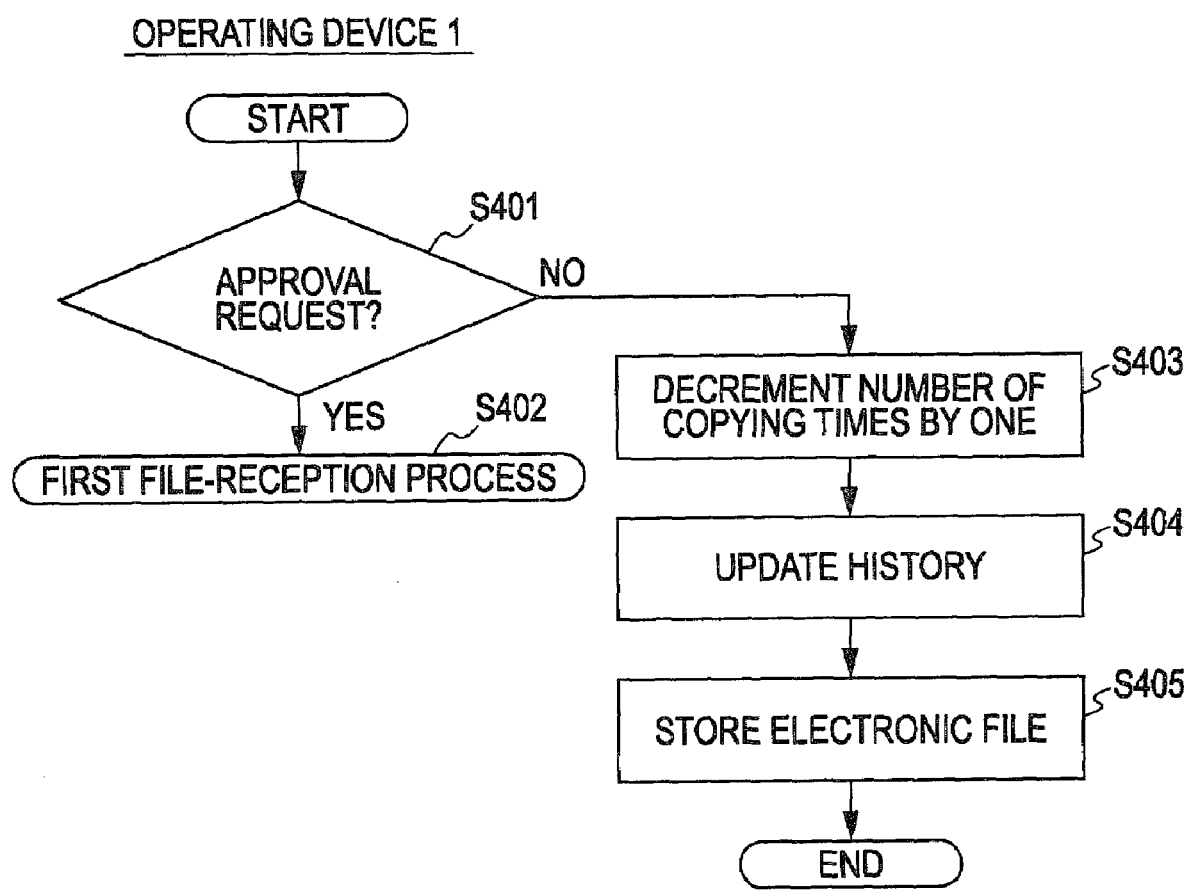
FIG. 10 is a flowchart showing an example of a second file-reception process performed by an operating device provided in an electronic file system according to an embodiment of the present invention.

FIG. 10 is a flowchart showing an example of a second file-reception process performed by the operating device 1 provided in an electronic file system according to an embodiment of the present invention. An operator performs an operation for designating, using the input means 14, an electronic file 400 whose contents are to be checked for from among a plurality of received electronic files 400. The operating device 1 receives an input for performance of an operation through the input means 14 under the control of the control means 10 that implements the computer program 200. The file manager 501 refers to an item of an approval-request active flag indicated in a restriction file 402 included in the designated electronic file 400, and determines whether the designated electronic file 400 is an electronic file 400 transmitted as an approval request (step S401). If it is determined in step S401 that the designated electronic file 400 is not an approval request, it is determined that the designated electronic file 400 is an electronic file 400 transmitted from another operating device 1 or the approval device 2. Then, the storing processing described below is performed.

If it is determined in step S401 that the designated electronic file 400 is not an approval request (if the determination in step S401 is NO), the operating device 1 decrements the number of times the copying operation is allowed to be performed indicated in the restriction file 402 included in the electronic file 400 by one under the control of the control means 10 (step S403). The file manager 501 updates a history file 403 indicated in the electronic file 400 in accordance with a reception status (step S404). Then, the electronic file 400 is stored into the file storing unit 500 of the recording means 12 (step S405). If the number of times the copying operation is allowed to be performed before the decrement in step S403 is zero or less, which is an abnormal value, the file manager 501 determines that an error occurs in the electronic file 400 and deletes the electronic file 400. In step S405, the electronic file 400, which has been encrypted, is stored. If the period of validity is described in the operation file 401, in the processing of storing the electronic file 400, the file controller 502 reads information on the period of validity and performs the period management described below.

If it is determined in step S401 that the designated electronic file 400 is an approval request (if the determination in step S401 is YES), the approval device 2 performs the processing of step S302 and the subsequent processing of the above-described first file-reception process under the control of the control means 20 (step S402). Accordingly, the second file-reception process is performed.

Figure 11:
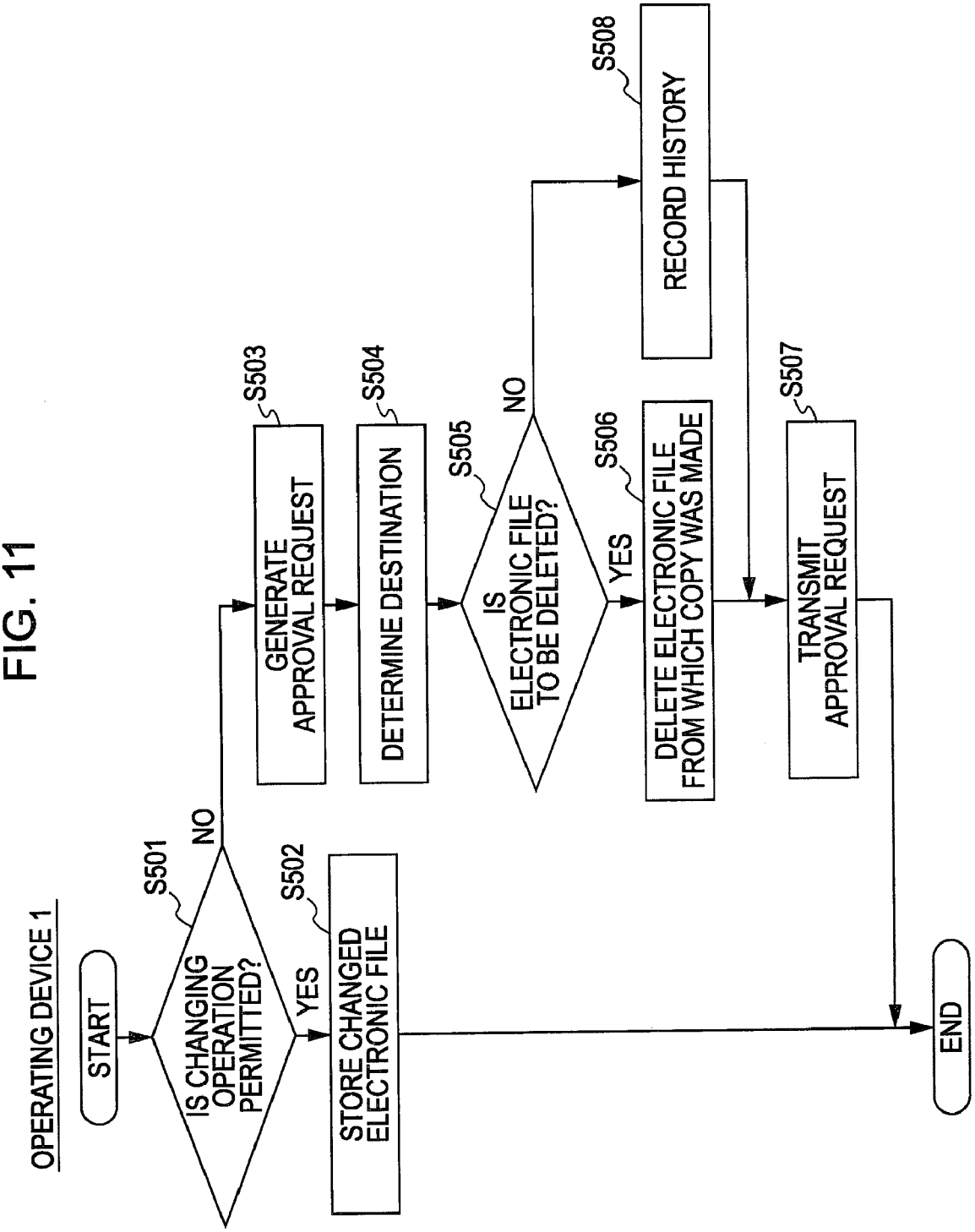
FIG. 11 is a flowchart showing an example of a file-changing process performed by an operating device provided in an electronic file system according to an embodiment of the present invention.

FIG. 11 is a flowchart showing an example of a file-changing process performed by the operating device 1 provided in an electronic file system according to an embodiment of the present invention. Normally, the electronic file 400 received by the operating device 1 is transmitted from another device in order that an operation is to be performed on the electronic file 400. Thus, an operator performs transaction based on an operation file 401 included in the electronic file 400 and performs an operation for changing the contents of the operation file 401. Since the operation file 401, which has been decrypted, is read to the spreadsheet software program 301 or the like, which is an application program, there is no restriction on changing of the operation file 401 in a state where the operation file 401 is read. However, in the processing of storing the changed operation file 401, it is determined whether the changing operation is permitted.

The operating device 1 receives an input for performance of an operation through the input means 14 under the control of the control means 10 that implements the computer program 200. The file manager 501 determines, in accordance with a restriction condition described in a restriction file 402 included in the electronic file 400, whether a changing operation performable on the operation file 401 is permitted (step S501). The restriction condition (policy) used in step S501 is a condition described as an item to be monitored in the restriction file 402. The restriction condition is capable of restricting a changing operation performable on a predetermined item or changing operations performable on a predetermined number of items or more. For example, when the spreadsheet software program 301 is used as an application program, a particular cell, a particular row or column, a particular sheet, a particular operation file 401, or the like can be designated as a predetermined item. In a case where the number of items on which changing operations were performed is detected, if there is a possibility in which a changing operation is performed on the same item a plurality of times, the history file 403 is referred to.

If it is determined in step S501 that the details of the changing operation do not correspond to the restriction condition and the changing operation can be performed without approval (if the determination in step S501 is YES), the operating device 1 causes, under the control of the control means 10, the file manager 501 to encrypt the electronic file 400 including the changed operation file 401 and to store the encrypted electronic file 400 into the file storing unit 500 of the recording means 12 (step S502).

If it is determined in step S501 that the details of the changing operation correspond to the restriction condition and the changing operation cannot be performed without approval (if the determination in step S501 is NO), the operating device 1 causes, under the control of the control means 10, the file manager 501 to generate an approval request for requesting approval of the performance of the operation (step S503). The approval request generated in step S503 is a copy of the electronic file 400 including the operation file 401 that has been subjected to the changing operation. In an approval-request active flag indicated in a restriction file 402 included in the copied electronic file 400, information indicating that approval is being requested is set and information on the details of the requested operation is recorded in the history file 403.

The operating device 1 causes, under the control of the control means 10, the file manager 501 to refer to an approver described in the restriction file 402 included in the electronic file 400 and to determine a request destination for the approval, that is, a transmission destination for the approval request (step S504). The file manager 501 refers to a deletion flag indicated in the restriction file 402, and determines whether the electronic file 400 from which the copy was made is to be deleted (step S505).

If it is determined in step S505 that the electronic file 400 from which the copy was made is to be deleted (if the determination in step S505 is YES), the operating device 1 causes, under the control of the control means 10, the file manager 501 to delete the electronic file 400 from which the copy was made (step S506). The file manager 501 causes the communication means 16 to transmit the copied electronic file 400 as an approval request to the approval device 2, which is the transmission destination (request destination) determined in step S504, via the communication network 100 in accordance with the electronic mail transmission/reception program 302, which is an application program (step S507). In step S507, the electronic file 400, which has been encrypted, is transmitted. Since the electronic file 400 from which the copy was made is deleted in step S506, if the performance of the changing operation on the operation file 401 is approved for the approval request, the approval device 2 performs processing, as approval processing for the changing operation, for transmitting the electronic file 400 that has been subjected to the changing operation, and the operating device 1 stores the received electronic file 400. If the performance of the changing operation is not approved, the approval device 2 performs processing, as non-approval processing for the changing operation, for transmitting the electronic file 400 that has not been subjected to the changing operation.

If it is determined in step S505 that the electronic file 400 from which the copy was made does not have to be deleted (if the determination in step S505 is NO), the operating device 1 causes, under the control of the control means 10, the file manager 501 to record history data of the changing operation into the history file 403 corresponding to the operation file 401 from which the copy was made (step S508). Then, the operating device 1 transmits the copied electronic file 400 as the approval request to the approval device 2 (step S507). Accordingly, the file-changing process is performed.

FIG. 12 is a flowchart showing an example of a file-period-management process performed by the operating device 1 provided in an electronic file system according to an embodiment of the present invention. As described in the explanation of the second file-reception process, in the processing of storing an electronic file 400, in a case where the period of validity is described in an operation file 401 included in the electronic file 400, period management based on the period of validity is performed. The period management based on the period of validity is processing for, in a case where a file-changing process has not been performed by the time when the period of validity is reached, that is, in a case where it is determined that an operation to be performed has not been performed by the time when the period of validity is reached, transmitting a notification urging an operator to perform the file-changing process. The operating device 1 causes, under the control of the control means 10 that implements the computer program 200, the file controller 502 to determine whether the period of validity has been reached (step S601).

If it is determined in step S601 that the period of validity has been reached (if the determination in step S601 is YES), the operating device 1 causes, under the control of the control means 10, the file manager 501 to refer to a restriction file 402 and a history file 403 corresponding to the electronic file 400 whose period of validity has been reached and to determine whether a predetermined file-changing process has been performed (step S602). For example, in step S602, it is determined whether a changing operation for a predetermined item described as an item to be monitored in the restriction file 402 has been performed.

If it is determined in step S601 that the period of validity has not been reached (if the determination in step S601 is NO), the control means 10 repeats the processing of step S601 under the control of the control means 10.

If it is determined in step S602 that the predetermined file-changing process has not been performed (if the determination in step S602 is NO), the operating device 1 causes, under the control of the control means 10, the file manager 501 to perform period-reach notification processing for notifying the operator that the period of validity has been reached (step S603). In the period-reach notification processing of step S603, for example, processing for displaying on the output means 25, which is a monitor, a dialog box indicating that the period of validity has been reached and for requesting the operator to perform the file-changing process is performed. The operator views the period-reach notification, and performs the file-changing process in accordance with the request for the file-changing process. Thus, after the execution of the period-reach notification processing, the operating device 1 proceeds to step S503 of the file-changing process under the control of the control means 10 and performs the subsequent processing.

If it is determined in step S602 that the predetermined file-changing process has been performed (if the determination in step S602 is YES), the operating device 1 proceeds, under the control of the control means 10, to step S503 of the file-changing process in order to request approval of the changing operation within the period of validity, instead of performing the period-reach notification processing of step S603. Then, the operating device 1 performs the subsequent processing. Accordingly, the period-management process is performed.

Each of the operations performed by the approval device 2 described in the above-described embodiment is merely an example. Processing relating to approval of various requests issued from the operating device 1 can be implemented as various modifications.

According to first, second, sixth, seventh, and eighth aspects of the present invention, since a restriction condition and a request destination are described in a restriction file, a file corresponding to general-purpose application software can be used as an operation file. Thus, functions of the general-purpose application software can be utilized without requiring performance of an operation, such as transfer, and the risk of leakage of a generated file due to transfer can be prevented. In addition, since the installation of a server computer that controls the entire system is not necessary, various types of cost relating to the installation of a server computer can be reduced. Moreover, an approval request is automatically transmitted to an approval device and the approval device performs processing relating to an approval operation. Thus, a management operation can be performed quickly.

According to a third aspect of the present invention, restriction on a changing operation performable on a predetermined item or changing operations performable on a predetermined number of items or more of an operation file and restriction relating to copying, such as the number of times a transmission operation is allowed to be performed, can be provided.

According to a fourth aspect of the present invention, performance of an operation may have to be approved by a plurality of approvers.

According to a fifth aspect of the present invention, an electronic file may be deleted. Thus, an incorrect operation can be prevented. In addition, the coexistence of operation files of a plurality of generations due to remaining of an operation file that has not been subjected to a changing operation can be prevented.

In an electronic file system, an operating device, an approval device, and a computer program according to an aspect of the present invention, the operating device for receiving an input for performance of an operation on an electronic file and the approval device used for approving the performance of the operation on the electronic file perform operations on the electronic file including an operation file on which an operation is to be performed and a restriction file indicating a restriction condition for restricting an operation performable on the operation file and a request destination for approval of the restricted operation. The operating device determines whether the operation to be performed on the operation file is permitted in accordance with the restriction condition described in the restriction file. When it is determined that the operation corresponds to the restriction condition, the operating device transmits to the approval device described as the request destination in the restriction file an approval request for requesting approval of the operation. When receiving an input indicating that the performance of the operation is approved for the received approval request, the approval device approves the performance of the operation.

With this configuration, a file corresponding to general-purpose application software can be used as an operation file. Thus, functions of the general-purpose application software can be utilized without requiring an operator of the operating device to perform an operation, such as transfer, and the risk of leakage of a generated file due to transfer can be prevented. Accordingly, the present invention achieves excellent advantages. In addition, since the installation of a server computer that controls the entire system is not necessary, various types of cost relating to the installation of a server computer can be reduced. Accordingly, excellent advantages can be achieved. Furthermore, since an approval request is automatically transmitted to the approval device and the approval device performs processing relating to an approval operation, the approval request can be automatically transmitted without requiring the operator to perform procedures for requesting approval. Thus, the number of operations can be reduced, and a management operation can be performed quickly. Accordingly, excellent advantages can be achieved.

In addition, according to an aspect of the present invention, a condition relating to a changing operation performable on the operation file and a condition relating to a copying operation performable on the operation file can be set. Restriction on a changing operation performable on a predetermined item or changing operations performable on a predetermined number of items or more of the operation file can be provided. Thus, when the contents of changing have reached a predetermined state, an approval request can be appropriately transmitted automatically. Accordingly, excellent advantages can be achieved.

Furthermore, according to an aspect of the present invention, since a plurality of request destinations of an approval request can be set, the performance of the operation may have to be approved by a plurality of approvers.

Moreover, according to an aspect of the present invention, when it is determined that the operation corresponds to the restriction condition, the electronic file can be deleted. Thus, an incorrect operation can be prevented. In addition, the coexistence of operation files of a plurality of generations due to remaining of an operation file that has not been subjected to a changing operation can be prevented. Accordingly, excellent advantages can be achieved.

What is claimed is:

1. An electronic file system comprising:
a storage that stores an electronic file including
an operation file on which an operation is to be performed, and
a restriction file indicating a restriction condition for restricting an operation on the operation file, and a request destination that approves a restricted operation on the operation file;
wherein the restriction file further includes, as the restriction condition to be determined by the first determination part, at least one of a condition relating to a changing operation performable on the operation file or a condition relating to a copying operation performable on the operation file; and
wherein the restriction file further includes, as the restriction condition relating to the changing operation performable on the operation file to be determined by the first determination part, at least either of an operation performable on a predetermined item or operations performable on a predetermined number of items or more;
an operating device that accepts an operation on the electronic file; and
an approval device that is used to approve a restricted operation on the electronic file;
wherein the operating device comprises:
a first determination part which determines whether an accepted operation to be performed on the operation file is permitted in accordance with a restriction condition described in the restriction file, and
in a case where the first determination part determined that the accepted operation is restricted, a first transmission part determines the approval device for approving the restricted operation based on a request destination described in the restriction file, and transmits to the determined approval device an approval request for requesting approval of the restricted operation.

2. The electronic file system according to claim 1, wherein the electronic file further includes a history file in which details of the operation performed on the operation file are recorded.

3. The electronic file system according to claim 1, wherein the approval device comprises:
a recording part which records the electronic file,
a second transmission part which transmits the recorded electronic file to the operating device,
a reception part which receives the approval request from the operating device, and
an approval part which approves the performance of the operation in a case where receiving an input indicating that the performance of the operation is approved for the received approval request.

4. The electronic file system according to claim 1, wherein the restriction file further includes, as the restriction condition relating to the copying operation performable on the operation file to be determined by the first determination part, the number of times the copying operation is allowed to be performed.

5. The electronic file system according to claim 1, wherein the restriction file further includes a condition relating to a period of validity, and
wherein the operating device comprises:
a second determination part which determines whether the period of validity described in the restriction file has been reached, and
a third transmission part which transmits to the approval device a period-reach notification indicating that the period of validity has been reached in a case where it is determined that the period of validity has been reached.

6. The electronic file system according to claim 1, further comprising a plurality of approval devices,
   wherein the restriction file further includes information indicating a plurality of request destinations.
7. The electronic file system according to claim 6,
   wherein the restriction file further includes information indicating a transmission sequence in association with the information indicating the plurality of request destinations.
8. The electronic file system according to claim 1,
   wherein the operating device comprises a deletion part which deletes the electronic file in a case where it is determined that the operation corresponds to the restriction condition.
9. An electronic file system comprising:
   an operating device for receiving an input for performance of an operation on an electronic file; and
   an approval device used for approving the performance of the operation on the electronic file,
   wherein the electronic file includes:
   an operation file on which an operation is to be performed, a restriction file indicating a restriction condition for restricting an operation performable on the operation file and a request destination for approval of the restricted operation,
   wherein the restriction file further includes, as the restriction condition to be determined by the first determination part, at least one of a condition relating to a changing operation performable on the operation file or a condition relating to a copying operation performable on the operation file; and
   wherein the restriction file further includes, as the restriction condition relating to the changing operation performable on the operation file to be determined by the first determination part, at least either of an operation performable on a predetermined item or operations performable on a predetermined number of items or more;
   wherein the operating device comprises:
   a recording part which encrypts the electronic file and records the encrypted electronic file, a management part which performs encryption and decryption of the electronic file recorded in the recording part and performs determination in accordance with the restriction condition described in the restriction file, and
   an application part which performs processing using the operation file, and wherein the management part comprises:
   a decrypting part which decrypts the operation file used in the processing of the application part,
   a determination part which determines, in accordance with the restriction condition described in the restriction file, whether the operation to be performed on the operation file is permitted in the processing of the application part using the operation file, and
   a transmission part which transmits to the approval device described as the request destination in the restriction file an approval request for requesting approval of the operation in a case where it is determined that the operation corresponds to the restriction condition.
10. An operating device for receiving an input for performance of an operation on an electronic file, comprising:
   a recording part which records an electronic file including: an operation file on which an operation is to be performed, a restriction file indicating a restriction condition for restricting an operation performable on the operation file, and
   wherein the restriction file further includes, as the restriction condition to be determined by the first determination part, at least one of a condition relating to a changing operation performable on the operation file or a condition relating to a copying operation performable on the operation file; and
   wherein the restriction file further includes, as the restriction condition relating to the changing operation performable on the operation file to be determined by the first determination part, at least either of an operation performable on a predetermined item or operations performable on a predetermined number of items or more;
   a request destination for approval of the restricted operation;
   a determination part which determines whether the operation to be performed on the operation file is permitted in accordance with the restriction condition described in the restriction file; and
   a transmission part which transmits to the request destination described in the restriction file an approval request for requesting approval of the operation in a case where it is determined that the operation corresponds to the restriction condition.
11. An approval device used for approving performance of an operation on an electronic file, an input for the performance of the operation being received by an operating device, comprising:
   a transmission part which transmits to the operating device an electronic file including: an operation file on which an operation is to be performed,
   a restriction file indicating a restriction condition for restricting an operation performable on the operation file, and
   wherein the restriction file further includes, as the restriction condition to be determined by the first determination part, at least one of a condition relating to a changing operation performable on the operation file or a condition relating to a copying operation performable on the operation file; and
   wherein the restriction file further includes, as the restriction condition relating to the changing operation performable on the operation file to be determined by the first determination part, at least either of an operation performable on a predetermined item or operations performable on a predetermined number of items or more;
   a request destination for approval of the restricted operation;
   a reception part which receives from the operating device an approval request for requesting approval of an operation corresponding to the restriction condition for the operation file; and
   an approval part which approves the performance of the operation in a case where receiving an input indicating that the performance of the operation is approved for the received approval request.
12. A computer-readable storage medium storing a program, the program causing a computer to execute the following:
   determining whether an operation to be performed on an operation file included in an electronic file including: the operation file on which an operation is to be performed, and a restriction file indicating a restriction condition for restricting an operation performable on the operation file, and a request destination for approval of the restricted operation is permitted in accordance with the restriction condition described in the restriction file; and wherein the restriction file further includes, as the restriction condition to be determined by the first determination part, at least one of a condition relating to a changing operation performable on the operation file or a condition relating to a copying operation performable on the operation file; and wherein the restriction file further includes, as the restriction condition relating to the changing operation performable on the operation file to be determined by the first determination part, at least either of an operation performable on a predetermined item or operations performable on a predetermined number of items or more;

transmitting to the request destination described in the restriction file an approval request for requesting approval of the operation in a case where it is determined that the operation corresponds to the restriction condition.

* * * * *